(12) United States Patent
Britton et al.

(10) Patent No.: US 6,401,101 B1
(45) Date of Patent: Jun. 4, 2002

(54) METHOD, SERVER/COMPUTER AND DATA STRUCTURE FOR IMPLEMENTATION OF COMPLEX OBJECTS IN AN OBJECT-ORIENTED DATABASE

(75) Inventors: David E. Britton, Annandale; Nicholas E. Karangelen, Arlington; Theresa Surowiec, Centreville; Thomas M. Kalafut, Arlington, all of VA (US); Michael Stoddard, Mount Airy, MD (US); Vasiliki Paraskevas Kelly, Fairfax, VA (US)

(73) Assignee: Trident Systems, Inc., Fairfax, VA (US)

( * ) Notice: Subject to any disclaimer, the term of this patent is extended or adjusted under 35 U.S.C. 154(b) by 0 days.

(21) Appl. No.: 09/320,983

(22) Filed: May 27, 1999

Related U.S. Application Data
(60) Provisional application No. 60/087,592, filed on Jun. 1, 1998.

(51) Int. Cl.[7] .............................................. G06F 17/30
(52) U.S. Cl. ........................ 707/103; 707/100; 707/10; 709/203
(58) Field of Search .............................. 707/103, 100, 707/10; 709/203

(56) References Cited

U.S. PATENT DOCUMENTS

| | | | | |
|---|---|---|---|---|
| 5,499,365 A | * | 3/1996 | Anderson et al. | 707/103 |
| 5,878,427 A | * | 3/1999 | Waheed et al. | 707/103 |
| 6,026,413 A | * | 2/2000 | Challenger et al. | 707/202 |
| 6,052,691 A | * | 4/2000 | Ardoin et al. | 707/102 |
| 6,058,416 A | * | 5/2000 | Mukherjee et al. | 709/203 |
| 6,119,125 A | * | 9/2000 | Gloudeman et al. | 707/103 |

OTHER PUBLICATIONS

Dentler et al., Upgrading A Complex Object DBMS to Full Object–Orientation: A Case Study, IEEE electronic library online, pp. 122–130, Oct. 1989.*
Van Bommel et al., Reasoning About Equations and Functional Dependencies on Complex Objects, IEEE electronic library online, pp. 455–469, Jun. 1994.*
Prakash et al., An Object Oriented Perspective for AC/MTDC System Simulation, IEEE electronic library online, pp. 97–101, Jan. 1996.*
Murthy et al., Organizing Engineering Designs and Design Techniques, pp. 977–984, Sep. 1990.*

* cited by examiner

*Primary Examiner*—Greta Robinson
(74) *Attorney, Agent, or Firm*—Hunton & Williams (57) ABSTRACT

The present invention provides a method, server/computer and data structure for reducing the overhead of dynamically linking attribute values across objects and minimizing memory requirements for storing cloned objects by utilizing a process of generating at least two Complex Objects, each having at least one Component Object, wherein each of said Complex Objects shares at least one Component Object with another Complex Object. By using a combination of Tailored Server and class methods (for construction, property access, copy, clone, delete, etc.) in handling the Complex Objects, the present invention hides the multiple Component Object complexity from the user and manages the generation and modification of Complex Objects including object schema definition and object instantiation. Thus, for example, Complex Object cloning permits a concomitant change for a common core property value to be accomplished for all clones that share the Shared Component Object.

39 Claims, 12 Drawing Sheets

METHOD, SERVER/COMPUTER AND DATA STRUCTURE FOR IMPLEMENTATION OF COMPLEX OBJECTS IN AN OBJECT-ORIENTED DATABASE

RELATED APPLICATIONS

This application claims priority under 35 U.S.C. §119(e) based on provisional application U.S. Ser. No. 60/087,592, entitled Method and Data Structure For Implementation Of Compound Objects In An Object Oriented Data Base, filed on Jun. 1, 1998, by inventors David Britton and Nicholas E. Karangelen.

BACKGROUND

An object-oriented database represents information in the form of objects which are instantiated from object class definitions and which typically include attributes, relationships and methods, collectively referred to as properties. An object class defines the data that the object will store and the functions that will operate on the data. Functions that operate on the data may be called methods. The object class definitions are typically structured to take advantage of property inheritance from parent to child. Inheritance is a mechanism which allows a second class to inherit properties from a first class. When a second class inherits from a first class, objects of the second class have access to attributes and methods of the first class without the need to redefine the attributes and methods locally. When a second class inherits from a first class, then the first class is called a parent class or superclass of the second class. The second class is called the child or subclass of the first class. Inheritance forces a child class to offer the same properties as its parent class. Thus, objects of a child may be used where objects of the corresponding parent are ordinarily used because objects of the child behave like objects of the parent. Multiple inheritance means that one child class may have more than one parent class, thus enabling the child class to inherit properties of more than one parent class and to merge the properties of the parent classes. The objects instantiated from a given class share a common property structure as if stamped from a common template (i.e., they are polymorphic). Polymorphism allows programs to apply the same operation to objects of different classes, thus allowing the same interface to access different objects. There are typically four basic data types (int, char, float, and double), each of which defines a set of values that the variable can store and a set of operations that the program can perform on the data. Each instantiated object's property values are independent from the property values of other objects. When copies of an instantiated object (hereinafter referred to simply as an "object") are generated, the property values are also copied. However, any future changes to the original or new object property values are reflected only in the object that was changed. In general, this separation between object property values is desired and any linkages between object property values are achieved using relationships. However, advanced object copy and replication approaches (such as cloning; cloning is defined below) and representing objects in multiple contexts require a means for efficiently linking groups of multiple object property values.

The following introduces a new method and data structure that employs Complex Objects to provide the necessary linkages between instantiated object property values. This capability is necessary where groups of object property values must be efficiently shared across multiple objects (e.g., object cloning) or where multiple representations are desired for a given object (e.g., multiple views).

SUMMARY OF THE INVENTION

The present invention provides a method, server, computer and data structure for generating at least two Complex Objects, each having at least one Component Object, wherein each of said Complex Objects shares at least one Component Object with another Complex. Object. A Complex Object includes: (1) one and only one Component Object that contains the identity properties unique to the Complex Object and (2) at least one other Component (i.e., Simple) Object identifying other properties of the Complex Object. By using a combination of Tailored Server and class methods (for construction, destruction, property access, copy, delete, clone, etc.) in handling the Complex Objects, the present invention hides the multiple Component Object complexity from the user and manages the generation and modification of Complex Objects including object schema definition and object instantiation. Thus, for example, Complex Object cloning permits a simultaneous change for a common core property value to be accomplished for all clones that share the Shared Component Object without the overhead of dynamically linking or replicating attribute values across objects. Additionally, the method of the present invention reduces memory requirements for storing cloned objects.

Detailed Description of Preferred Embodiments

Figure 4:
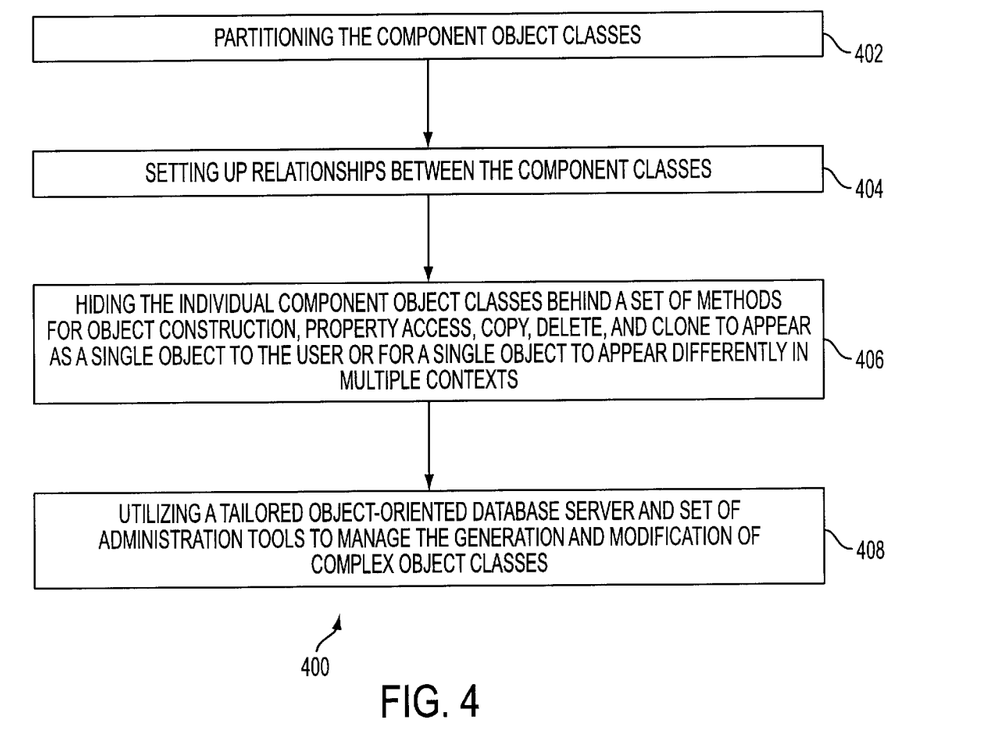
FIG. 4 illustrates one embodiment of steps for managing a Complex Object in accordance with the present invention.

A class provides a template, defining the member methods and data required by the class. In contrast, an object is a specific instance of a class, essentially a class variable. The object is a collection of data and a set of operations called methods that are used to manipulate the data. The class must be defined before the object is declared. To declare the class variable, the class is set forth, followed by the object's variable name. Creating an object is described as instantiating an object or creating an object instance. A Complex Object is defined herein as a group of Component Objects. As shown in the flowchart in FIG. 4, numeral 400, the Complex Object is managed by 1) partitioning (402) the Component Classes, 2) setting up relationships (404) between the Component Classes, and 3) hiding (406) the individual Component Classes behind a set of methods for object construction, property access, copy, delete, and clone to appear as a single object to the user or for a single object to appear differently in multiple contexts. Additionally, the tailored object-oriented database server and set of administration tools manage (408) the generation and modification of Complex Object classes.

Figure 14:
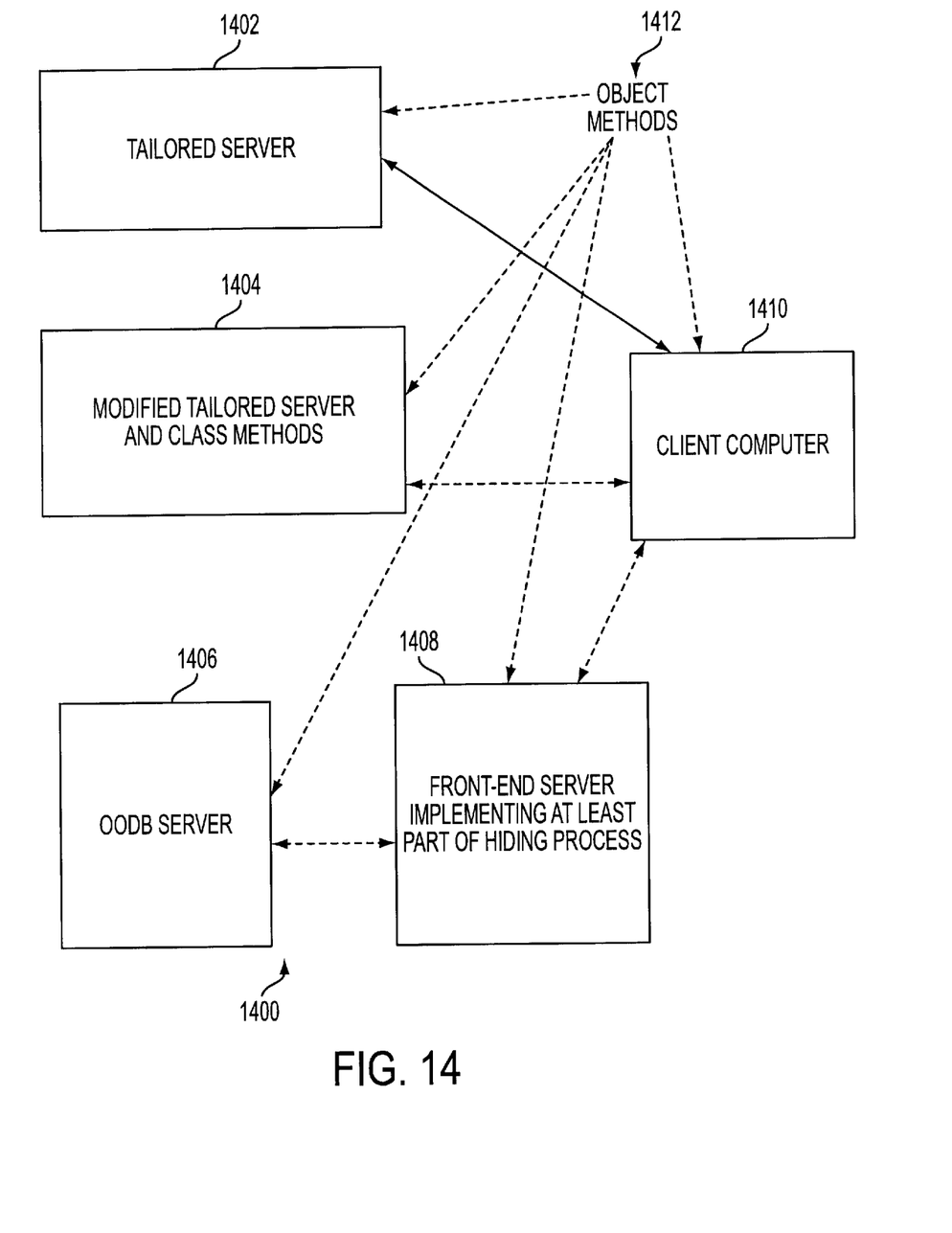
FIG. 14 is a block diagram illustrating three alternative embodiments for implementing the present invention.

Depending on the Object Oriented Database (OODB) used, these object methods 1412 are either executed on the server or on the client (i.e., a client computer). Alternatively, as shown in FIG. 14, numeral 1400, hiding the individual component classes (implementing the object construction, property access, copy, delete, and clone methods) may be performed by a Tailored Server 1402 or by a combination of a Modified Tailored Server and class methods 1404 (described above) depending on the capabilities of the OODB used. FIG. 14 illustrates three alternative embodiments for implementing the present invention. For example, some OODBs do not allow object construction or destruction (deletion) methods to be defined. In this case, the copy, clone, and property access methods may be implemented as methods defined in the object and the construction and destruction (delete) methods can be performed by the Tailored Server. The Tailored Server can be implemented by actually modifying the OODB or it can exist as a separate process that acts as a front-end server 1408 residing between the client 1410 and the OODB server 1406. The Tailored Server may exist as a separate process using standard distributed object mechanisms such as Java RMI (Remote Method Invocation), Microsoft's DCOM (Distributed Component Object Model), or OMG's (Object Management Group's) CORBA (Common Object Request Broker Architecture) to hide the actual server implementation from the client, hiding individual Component Object classes behind a set of methods for object construction, property access, copy, delete, and clone so that they appear as a single object.

A given Complex Object may have Component Objects that it shares in common with other Complex Objects, such as in object cloning, where the core descriptive properties are common. A given Complex Object may also have multiple Component Objects of the same type, such as in multiple views of a given object, where a separate set of view properties is stored for each different view of the object. The Tailored Server hides the multiple Component Object complexity from the user and manages the generation and modification of Complex Objects including object schema definition and object instantiation.

Figure 1:
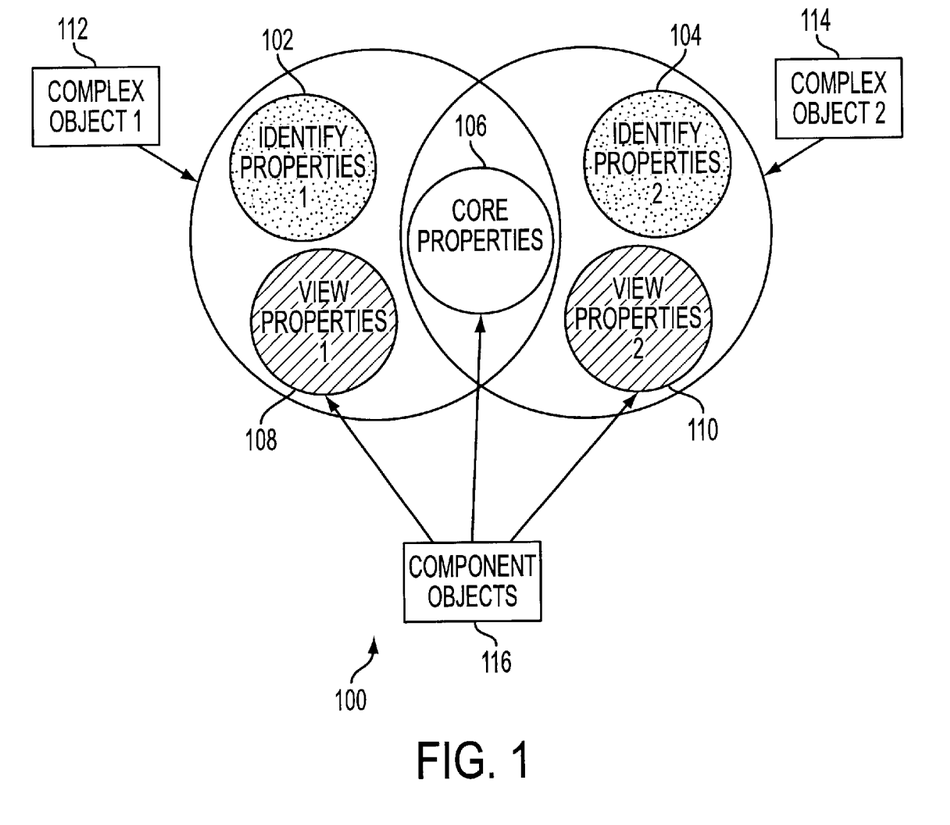
FIG. 1 illustrates an example of Complex Objects sharing core properties, in accordance with the present invention, to support efficient object cloning.

A given Complex Object may have Component Objects that it shares in common with other Complex Objects, such as in object cloning, where the core descriptive attribute values are common. FIG. 1, numeral 100, illustrates an example of Complex Objects sharing core properties, in accordance with the present invention, to support object cloning. In this example, each of Complex Object 1 (112) and Complex Object 2 (114) has three Component Objects (116): one that contains the unique identity and relationship property values (Identity Properties 1, 102; Identity Properties 2, 104), one that contains common core descriptive property values (Core Properties, 106), and one that contains unique view properties of the Complex Object (View Properties 1, 108; View Properties 2, 110).

The unique identity properties may include attributes such as name, location, and external relationships (e.g., connected to). The common descriptive properties may include color, height, weight, etc. The unique view properties will be discussed in the following section. A clone is defined herein as a Complex Object that shares a Component Object with other Complex Objects containing common core property values. Any number of clones could exist, all of which shared the common core property values, much like biological clones with identical DNA but with unique identities and viewed representations. The added advantage of Complex Object clones is that if a shared core property value is changed in any of the clones, then that property value is so changed for all clones that share the Component Object. Such an approach has several advantages over traditional methods for linking object attribute values. The Complex Object approach dramatically reduces the overhead of dynamically linking attribute values across objects as well as reducing the memory requirements for cloned object storage.

Figure 2:
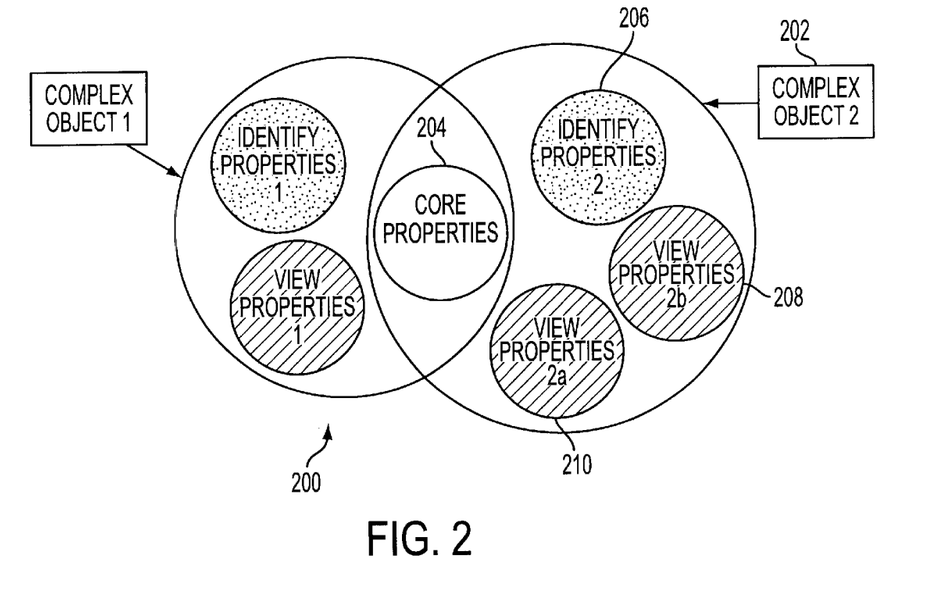
FIG. 2 illustrates the example of FIG. 1, extended to show multiple views of Complex Object 2 in accordance with the present invention.

A given Complex Object may also have multiple Component Objects of the same type, such as in multiple views of a given object, where a separate set of view properties is stored for each different view of the given object. The unique view properties may include a representative con, two-dimensional schematic, or three-dimensional rendering. An extension of the previous example adding multiple views of Complex Object 2 (202) is shown in FIG. 2, numeral 200. In this example, Complex Object 2 (202) has four Component Objects (204, 206, 208, 210) including two view Component Objects (208, 210). Each of the two view Component Objects (208, 210) contains unique visualizations of Complex Object 2 (202) and information on the context in which the view components are displayed.

In this example, the Component Object labeled "View Properties 2a" (210) includes properties specifying a three-dimensional model of Complex Object 2 (202) along with its location and orientation in a given virtual rendering. The Component Object labeled "View Properties 2b" (208) includes properties specifying a two-dimensional schematic of Complex Object 2 (202) along with its location and orientation in a given schematic. Thus, the multiple view Component Objects provide a mechanism for a given Complex Object to be represented in multiple views that have entirely different representations and contexts.

Figure 3:
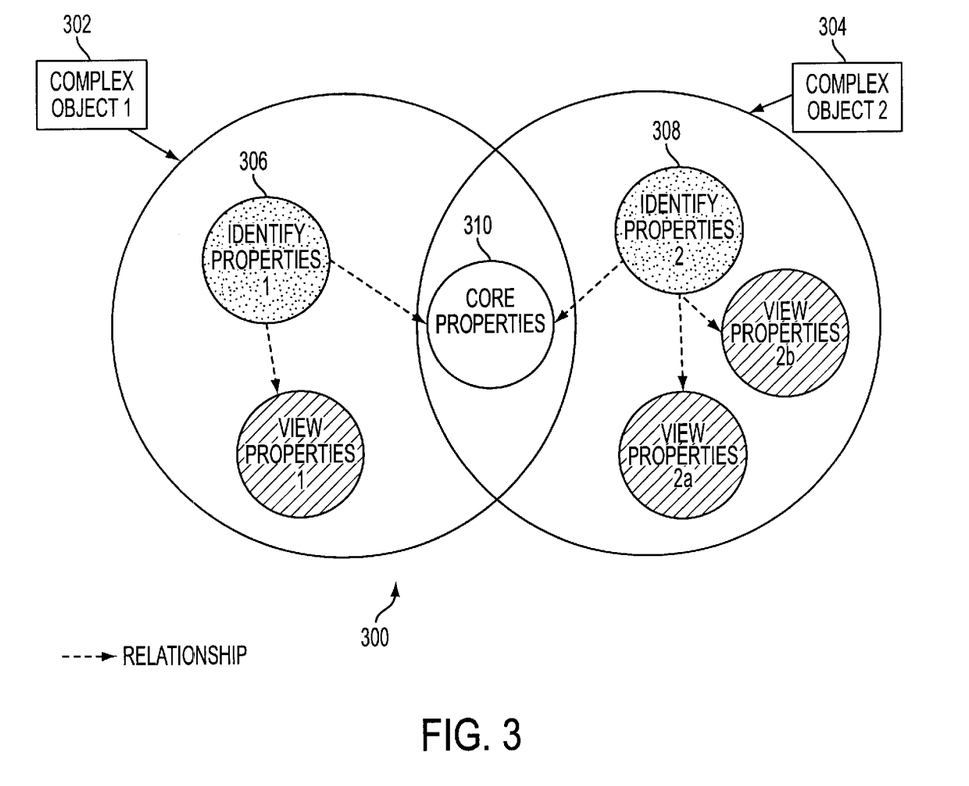
FIG. 3 illustrates an example of Complex Objects showing selected relationships between Component Objects in accordance with the present invention.

The Complex Object data structure is implemented as a group of Component Objects and relationships that collectively enable the Tailored Server to efficiently manage the Complex Objects in a manner transparent to the user. Each Complex Object includes one, and only one, Identity Component Object that contains the identity properties unique to that particular instance, as well as a set of relationships which identify the other Component Objects (e.g., core and view) that make up the Complex Object. FIG. 3, numeral 300, illustrates an example of Complex Objects showing selected relationships between Component Objects in accordance with the present invention. In the object-cloning example described above, the core representation properties are implemented in a Shared Component Object. Both Complex Objects (i.e., 1 and 2) 302, 304) have a relationship in their identity Component Object (Identity Properties, 306; identity Properties, 308) that points to the Shared Component Object containing the core representation properties (Core Properties, 310). Class methods (for construction destruction, property access, copy, delete, clone, etc.) hide the multiple Component Object complexity from the user. A Tailored Server and set of administrative tools may be used to manage generation and modification of Complex Objects including object schema definition and object instantiation. The set of administrative tools include an advanced object schema editor that automatically generates Component Object class definitions including the relationships between Component Object classes, and the methods necessary to support the Complex Objects (e.g., attribute "get" and "set" methods) which would otherwise be generated manually by the user.

The following functionality is generated from the advanced schema editor for each Complex Object generated by the user:

1. All the methods for accessing the objects' properties are defined in the Identity Component Class. These methods are the "get" and "set" methods that provide access to the identity and core view properties through the Complex Object.

Access of Properties involves the retrieval of values and the setting of values through individual method calls defined in the Identity Component Class. All exposed properties of the Shared Component Class have access methods defined in the Identity Component Class.

Hidden properties are properties defined in the Shared Component Class which have no access methods defined in the Identity Component Class.

Figure 10:
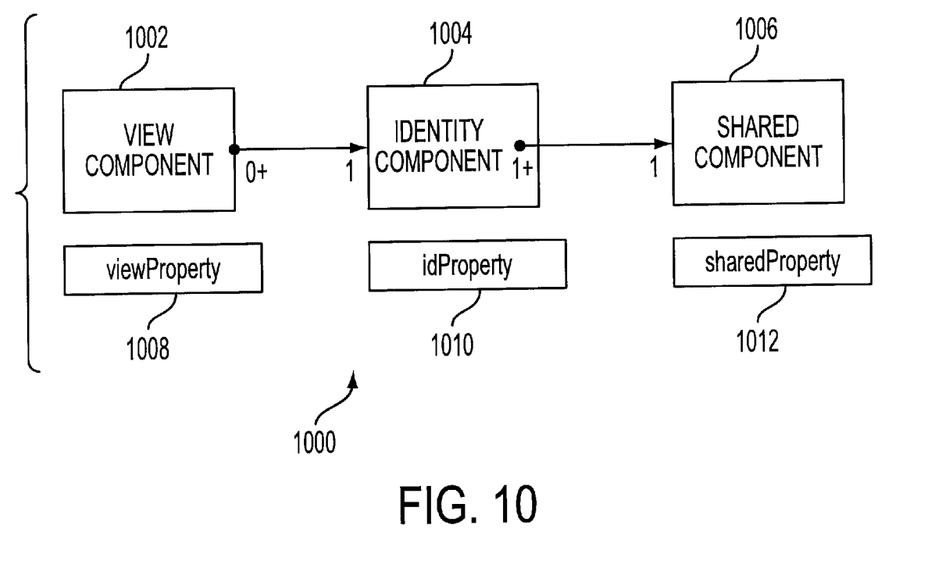
FIG. 10 is a block diagram illustrating three Properties and their respective component classes.

As shown in FIG. 10, numeral 1000, there are three types of Properties: properties (e.g., Property 1010) that reside in the Identity Component Class 1004, properties (e.g., sharedProperty 1012) which reside in the Shared Component Class 1006, and properties (e.g. viewproperty 1008) which reside in the View Component Class 1002. The arrows between the blocks are relationships and the numbers at each end show the multiplicity between the components. In this figure there can be zero or more "0+" View Components to every one "1" Identity Component and one or more "1+" Identity Components for every one "1" Shared Component.

Figure 11:
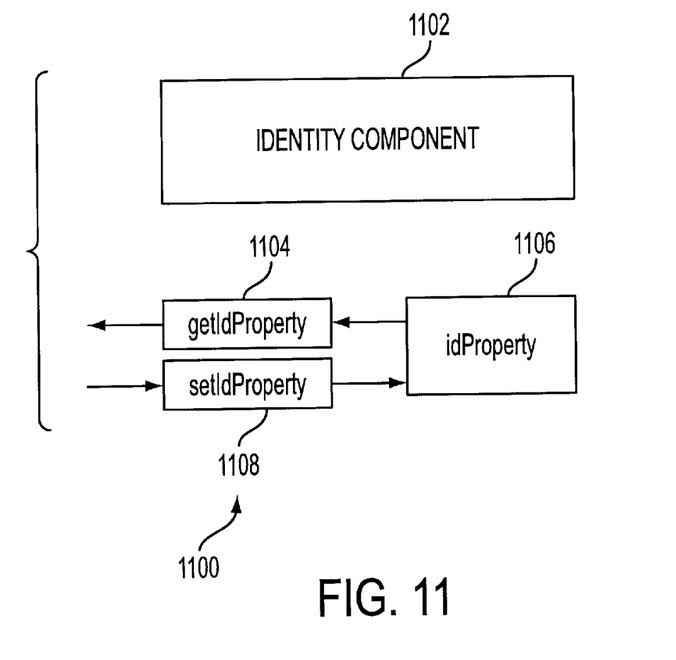
FIG. 11 is a block diagram illustrating access to standard methods defined in the Identity Component class.

Properties which reside in the Identity Component Class are unique for each instance of a Class. Instance specific properties, such as relationships with other objects, the name of an instance, its description, etc. are defined as Unique Properties. The Properties are accessed through standard methods defined in the Identity Component Class, as shown in FIG. 11, numeral 1100, which usually follow the design convention of <Type>get<Property-Name>( )
   Void set<Property-Name>(<Type>value)

That is, the method includes setting an identification property (setIdPropert 1108), using the identification property specified (idproperty 1106) and getting the identification property (getIdPropert 1104).

The methods are generally simple, one line methods which set or return the value of the unique Property. For example, for a property of type String named Description, access method definitions may look like the following.

```
String getDescription( )
{
    return(description)
}
Void setDescription(String value)
{
    set description = value
}
```

Properties, which reside in the Shared Component Class, are shared among multiple Clones of a Class. The Properties include any specific property that is desired to be the same for all cloned instances of a Class. The Properties are accessed through methods defined in the Identity Component 1202, as shown in FIG. 12, numeral 1200, which usually follow the design conventions of:

<Type>get<Property-Name>()
   Void set<Property-Name>(<Type>value)

Figure 12:
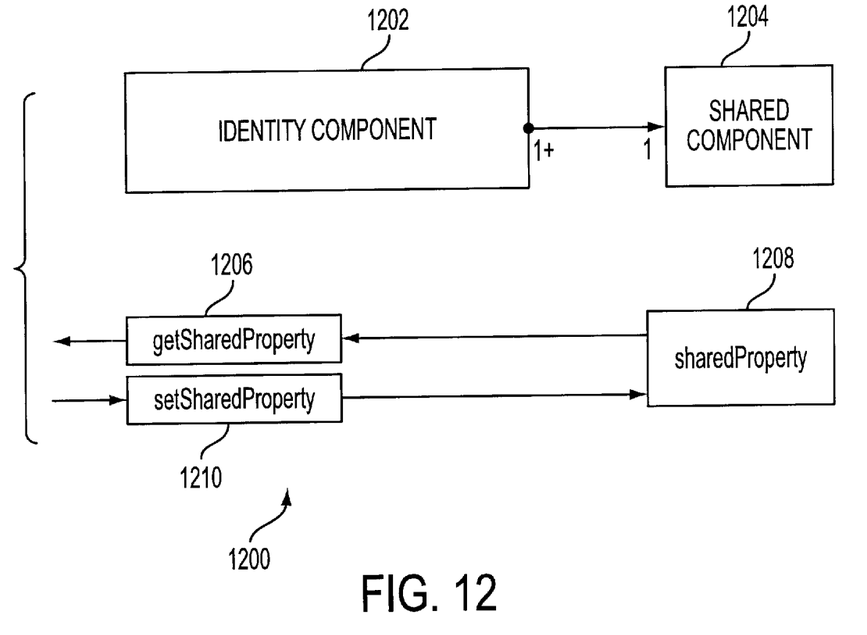
FIG. 12 is a block diagram illustrating access to standard methods defined in the Shared Component class.

In FIG. 12, the arrows between the blocks are relationships and the numbers at each end show the multiplicity between the components. In this figure there can be one or more "1+" Identity Components to every one "1" Shared Component. The methods shown in FIG. 12, defined in the Identity Component Class, must first obtain the reference (relationship) to the Shared Component 1204 contained therein. Then, utilizing the reference to the shared component, they must then set (setShared Property 1210) or return the value of the given Property (sharedproperty 1208) in the Shared Component Class as if it were a property native to the Identity Component Class itself (getSharedProperty 1206). For example, for a property of type String named Shared Description, a method definition may look like the following:

```
String getSharedDescription( )
{
    Object shared = sharedObjectReference
    return(shared.getSharedDescription( ))
}
Void setSharedDescription(String value)
{
    Object shared = sharedObjectReference
    set shared.setSharedDescription(value)
}
```

2) The Identity Component Class construction method is overloaded to provide a View and Shared Component Object and to generate a relationship from an Identity Component Object to the View and Shared Component Object that is generated when the Identity Component Object is generated.

Creating a Complex Object:
   construct the Shared Component Object
   construct the Identity Component Object
   set default property values including any unique properties for this object
      (e.g. object permissions, created by, created when, last modified by, and last modified when attributes)
   add the Shared Component to the Identity Component's 'shared' relationship return the new Identity Component Object 3) The Identity Component Class destructor method is overloaded so that all View and the Shared Component Object (if no other object is currently sharing it) are destroyed.

Deleting a Complex Object:

```
delete Unique Properties
if Complex Object's Shared Component Object exists
then
    delete relationship to Shared Component
    If the Complex Object's Shared Component Object is not shared
        with another Complex Object
    then
        delete Shared Component
    endthen
endthen
delete View Components
```

4) The Identity Component Class copy constructor/method is defined so that when the Complex Object is copied, the Shared and selected View Component Objects are also copied.

Complex Object Copy:

copy any unique properties that need to be copied as defaults in new object.

set default property values including any unique properties for this object (e.g. object permissions, created by, created when, last modified by, and last modified when attributes)

construct the Shared Component construct the Identity Component add the Shared Component to the Identity Component's 'shared' relationship     return the new Identity Component Object 5) The Identity Component Class clone constructor/method is defined so that when the Complex Object is cloned, only the Identity and selected View Component Objects are copied and a relationship is generated to reference the Shared (core) Component Object.

Clone method for a Complex Object:

construct the Identity Component set default property values including any unique properties for this object (e.g. object permissions, created by, created when, last modified by, and last modified when attributes) or any properties copied from the clone object     add the cloned object's Shared Component to the Identity Component's 'shared' relationship     return the new Identity Component Object 6) The View Component Class methods are defined for managing one or more view representations of each object.

View Properties

Figure 13:
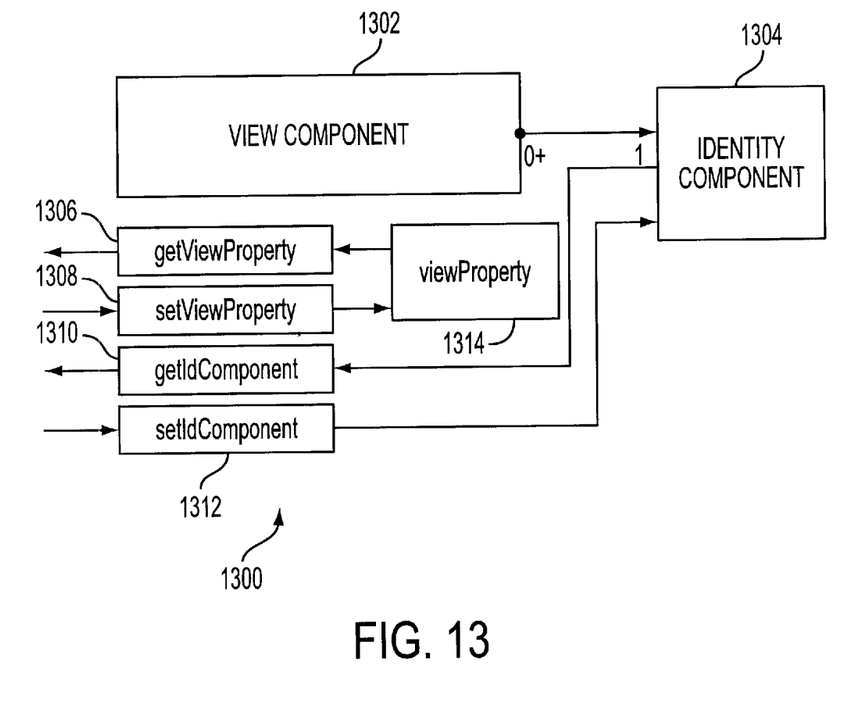
FIG. 13 is a block diagram illustrating access to specific properties of the Identity Component Class directly from the View Component Class.

Properties which reside in the View Component Class are unique to a specific View of an instance of a Class. As shown in FIG. 13, numeral 1300, view specific properties, such as the Icon used, its current location and size, border type, color, etc. are defined as View Properties (e.g., viewProperty 1314). The view properties are accessed through standard retrieval methods defined in the View Component Class, which usually follow the design convention of:

| | |
|---|---|
| <Type>get<Property-Name>( ) | (getViewProperty 1306) |
| Void set<Property-Name>(<Type>value) | (setViewProperty 1308) |

In FIG. 13, the arrows between the blocks are relationships and the numbers at each end show the multiplicity between the components. In this figure there can be zero or more "0+" View Components to every one "1" Identity Component. The methods shown in FIG. 13 are defined in the View Component Class. In general, paint or layout operations need only access the view properties directly through standard retrieval methods defined in the View Component Class. In some cases, however, it may be useful to obtain specific properties of the Identity Component Class directly from the View Component Class. Examples of this may be the name of the Identity Component 1304, or its description, or a shared property, such as the "Shared Description" property mentioned above. In this case the properties must be set or retrieved through the access methods of the Identity Component Class. In this way, the View Component 1302 need not have any prior knowledge of which properties in the Identity Component 1304 are unique or shared. For these cases, the View Component 1304 provides only one access method for these types of Properties, that is, a method which returns the Identity Component 1302 itself. Further access can then be obtained directly from the Identity Component without the View Component requiring knowledge of the specific class of Identity Object it represents.

| | FIG. 13 Reference |
|---|---|
| IdComponentBaseClass getIdComponent( )<br>{<br>    return(idComponent)<br>}<br>Void setIdComponent(IdComponentBaseClass value)<br>{<br>    set idComponent = value<br>} | (1310)<br><br><br><br><br><br>(1312) |

This built-in functionality allows an application to generate and modify Complex Objects through a single object.

Figure 5:
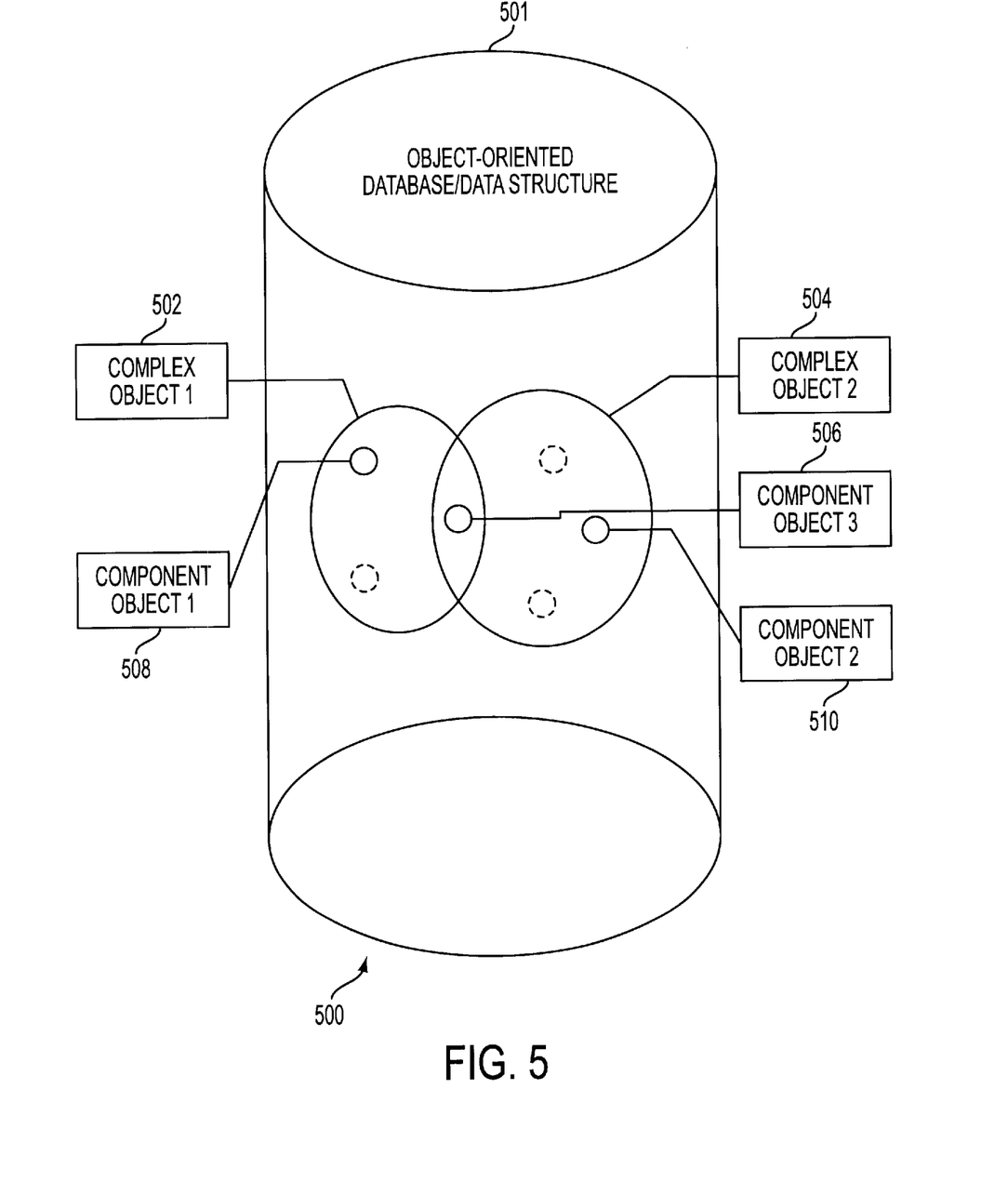
FIG. 5 is a diagrammatic representation of one embodiment of an object-oriented database/data structure in accordance with the present invention.

Thus, as shown in FIG. 5, numeral 500, the present invention may include an object-oriented database (501) that includes at least two Complex Objects (502, 504), each having at least one Component Object (506, 508; 506, 510), wherein each of said Complex Objects shares at least one Component Object (506) with another Complex Object. Alternatively, the object-oriented database may be viewed as a data structure (501) that includes at least two Complex Objects as described above.

Figure 6:
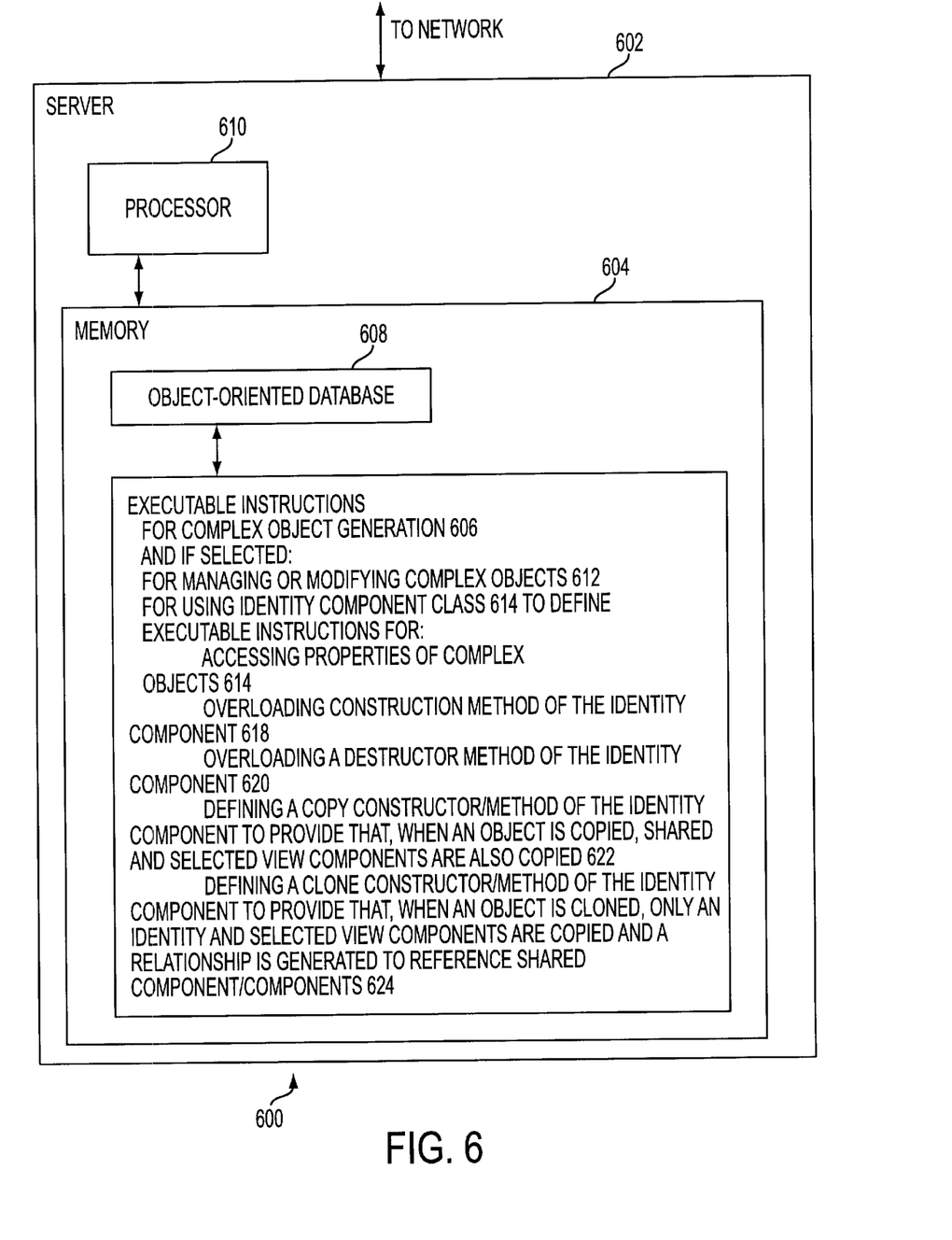
FIG. 6 is a block diagram of a preferred embodiment of a server in accordance with the present invention.

As shown in FIG. 6, numeral 600, the present invention may be embodied in a server (602) that includes a memory (604) having stored thereon executable instructions (606) for generating at least two Complex Objects, each having at least one Component Object, wherein each of said Complex Objects shares at least one Component Object with another Complex Object and an object-oriented database (608) for storing object-oriented data; and a processor (610), coupled to the memory (604), for utilizing the executable instructions to generate the Complex Objects. Where desired, the executable instructions may further include instructions (612) for at least one of: managing or modifying the Complex Objects. Typically, an Identity Component Class (614) defines the executable instructions for accessing properties (616) of the Complex Objects. The executable instructions may include instructions for overloading a construction method (618) of the Identity Component Class to provide a view and a shared (core) object and to generate a relationship to the Complex Objects that are generated when the Identity Component Object is generated. The executable instructions may also include instructions for overloading a destructor method (620) of the Identity Component Class to provide for destroying View Component Objects and a Shared Component Objects where said View or Shared Component Objects are unshared by another Complex Object. Where selected, a copy constructor/method (622) of the Identity Component Class may be defined to provide that, when an Complex Object is copied, Shared and selected View Component Objects are also copied. Where desired, a clone constructor method (624) of the Identity Component Class may be defined to provide that, when an object is cloned, only an Identity and selected View Component Objects are copied and a relationship is generated to reference Shared Component Object(s).

Figure 7:
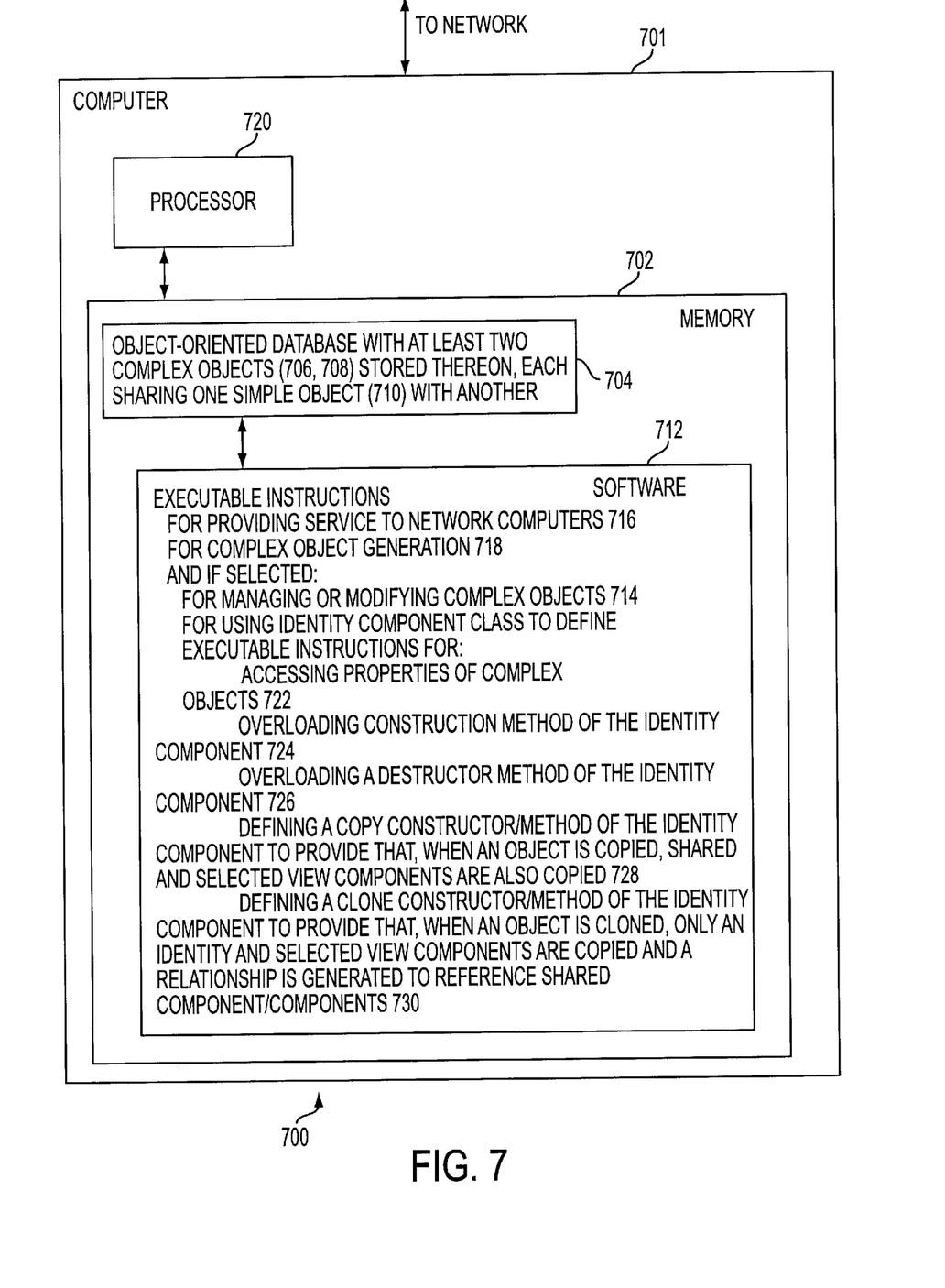
FIG. 7 is a block diagram of a preferred embodiment of a computer in accordance with the present invention.

FIG. 7, numeral 700, is a bock diagram illustrating, in accordance with the present invention, a computer in a network for generating at least two Complex Objects having at least one Component Object each, wherein each of said Complex Objects shares at least one Component Object with another Complex Object. The computer (701) includes a memory (702) having stored thereon an object-oriented database (704) having at least two Complex Objects (706, 708) stored thereon, each having at least one Component Object, wherein each of said Complex Objects shares at least one Component Object (710) with another Complex Object; and software (712) loaded thereon, wherein said software (712) includes executable instructions for providing service (716) to other computers on the network and executable instructions for generating Complex Objects (718); and a processor (720) coupled to the memory (702), for implementing the executable instructions for providing service (716) to other computers and for utilizing the executable instructions to generate Complex Objects (718). Where selected, executable instructions may further include instructions for at least one of: managing or modifying (714) the Complex Objects. Typically, an Identity Component Class defines the executable instructions for accessing properties (722) of the Complex Objects. The executable instructions may include instructions for overloading a construction method (724) of the Identity Component Class to provide a view and a shared (core) object and to generate a relationship from the Identity Object to the View and Shared (core) Object that is generated when the Identity Component Object is generated. In addition, the executable instructions may include instructions for overloading a destructor method (726) of the Identity Component Class to provide for destroying View Component Objects and a Shared Component Object where said View/Shared Component Objects are unshared by another Complex Object. Where desired, a copy constructor/method (728) of the Identity Component may be defined to provide that, when an object is copied, Shared and selected View Component Objects are also copied. Also, where selected, a clone constructor/method (730) of the Identity Component Class may be defined to provide that, when an object is cloned, only an Identity and selected View Component Objects are copied and a relationship is generated to reference Shared Component Object(s).

Figure 8:
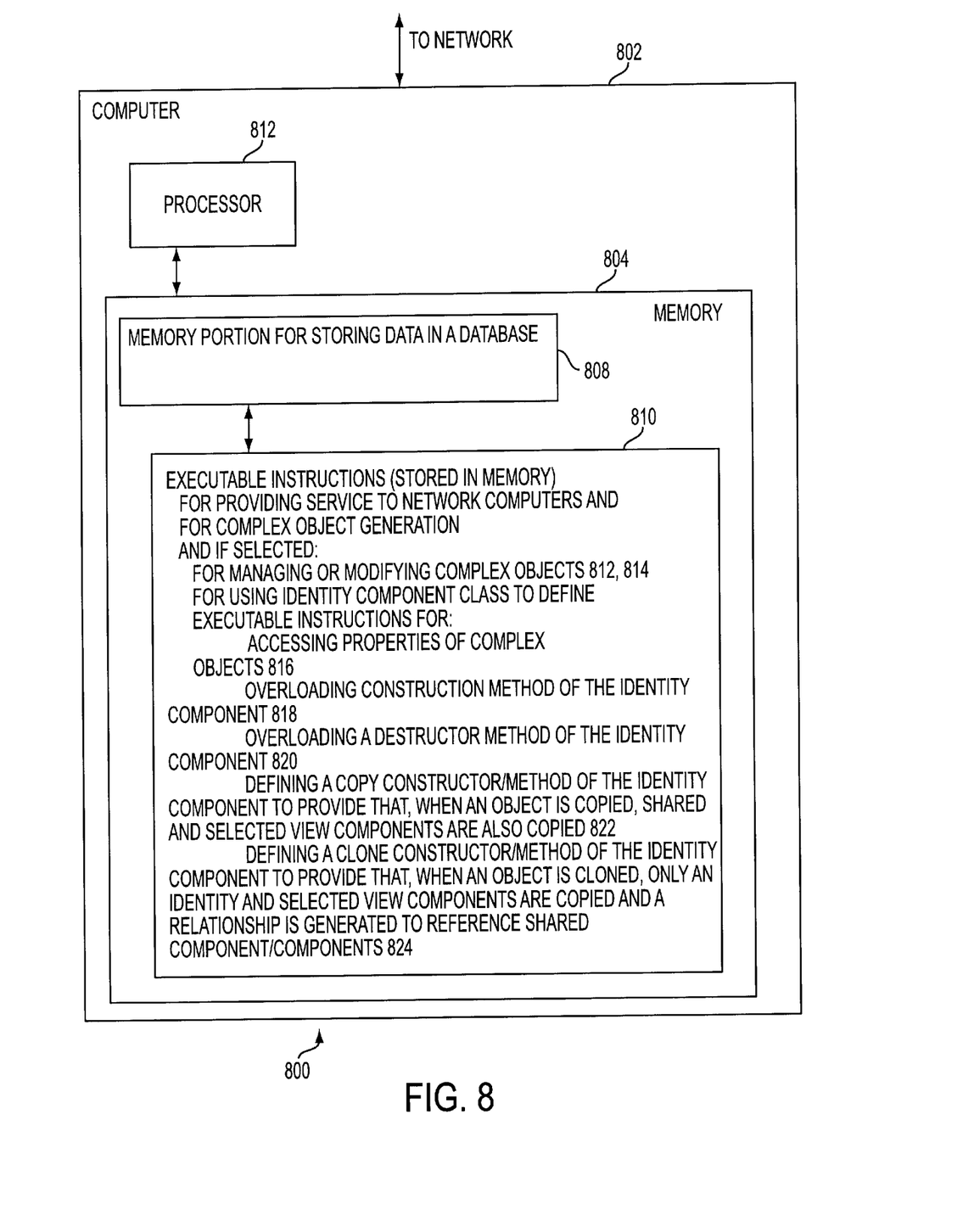
FIG. 8 is a block diagram of another preferred embodiment of a computer in accordance with the present invention.

In another preferred embodiment, as shown in FIG. 8, numeral 800, the present invention may be embodied in a computer (802) in a network that includes: (A) a memory (804) having: a memory portion (806) for storing data in a database (808) and executable instructions (810) stored thereon for generating Complex Objects; and (B) a processor (812) coupled to the memory (804), for utilizing the executable instructions (810) to generate the Complex Objects. The processor (812) typically generates at least two Complex Objects, each having at least one Component Object, wherein each of said Complex Objects shares at least one Component Object with another Complex Object, and the database is an object-oriented database for storing the at least two Complex Objects. Where selected, the executable instructions (810) include instructions for providing service to other computers in the network. Thus, the processor may further implement the executable instructions for providing service to the other computers. Where selected, the executable instructions (810) may further include instructions for at least one of: managing (812) or modifying (814) Complex Objects. Where desired, an Identity Component Class may define executable instructions for accessing properties (816) of the Complex Objects. In addition, the executable instructions may include instructions for overloading a construction method (818) of the Identity Component Class to provide a view and a shared object and to generate a relationship to the Complex Objects that are generated when the Identity Component Object is generated. Where selected, the executable instructions may include instructions for overloading a destructor method (820) of the Identity Component Class to provide for destroying View Component Objects and a Shared (core) Component Objects where said View/Shared Component Objects are unshared by another Complex Object. A copy constructor/method (822) of the Identity Component Class may be defined to provide that, when an object is copied, Shared and selected View Component Objects are also copied. A clone constructor/method (824) of the Identity Component Class may be defined to provide that, when an object is cloned, only an Identity and selected View Component Objects are copied and a relationship is generated to reference Shared Component Object(s).

Figure 9:
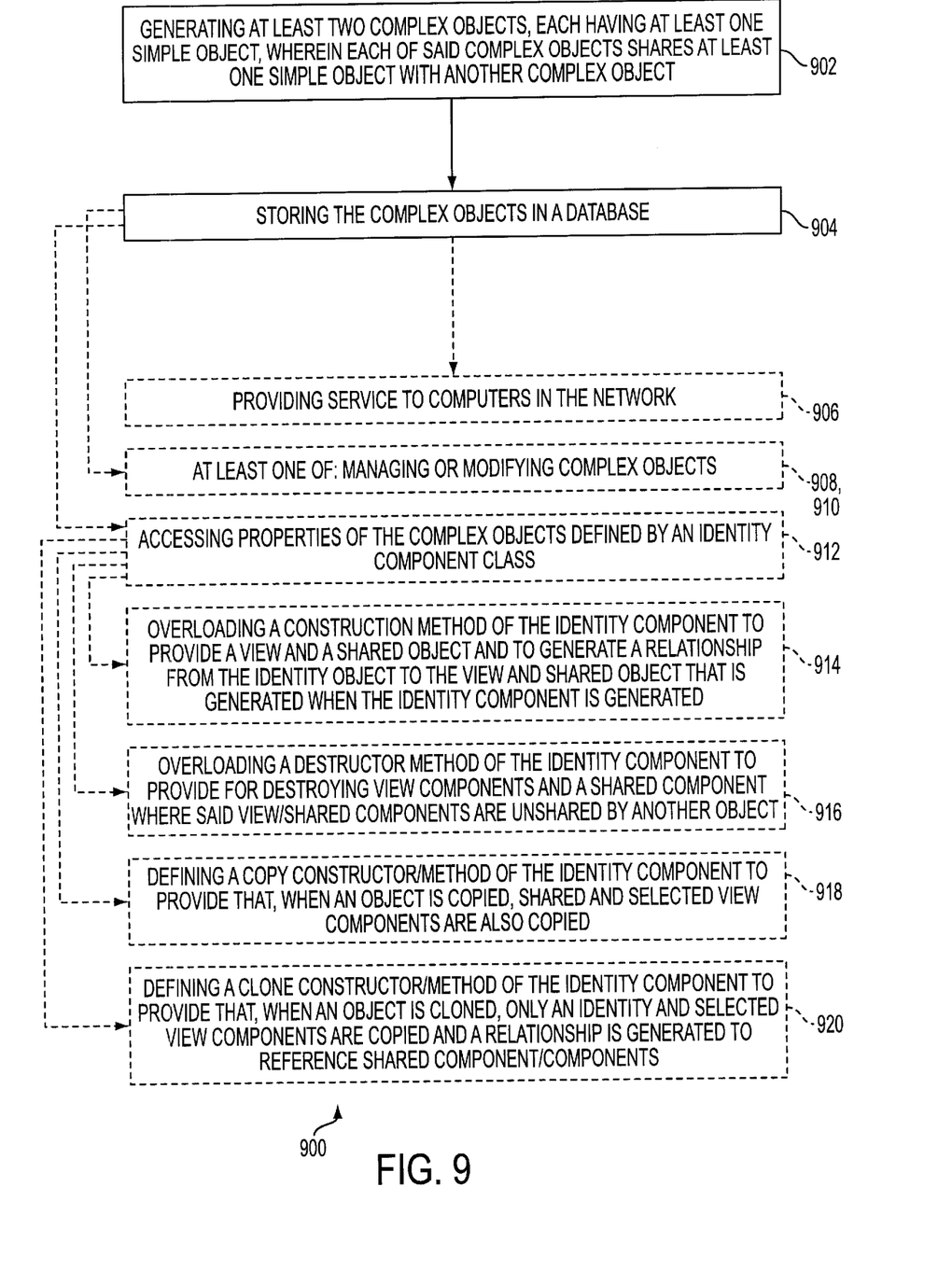
FIG. 9 is a flow chart showing a preferred embodiment of steps in accordance with the method of the present invention (optional steps shown by dashed lines).

FIG. 9, numeral 900, is a flow chart showing one embodiment of steps of a method for providing an object-oriented database with Complex Objects in a network in accordance with the present invention. The method includes the steps of: generating (902) at least two Complex Objects, each having at least one Component Object, wherein each of said Complex Objects shares at least one Component Object with another Complex Object; and storing (904) the Complex Objects in a database. The method may further include the step of providing (906) service to computers in the network. The method may further include at least one of: managing (908) or modifying (910) Complex Objects. Also, the method may include at least one of: accessing (912) properties of the Complex Objects defined by an Identity Component Class, overloading (914) a construction method of the Identity Component Class to provide a view and a shared (core) object and to generate a relationship from the Identity Object to the view and shared (core) object that is generated when the Identity Component Object is generated, overloading (916) a destructor method of the Identity Component Class to provide for destroying View Component Objects and a Shared Component Object where said View or Shared Component Objects are unshared by another Complex Object, defining (918) a copy constructor/method of the Identity Component Class to provide that, when an object is copied, Shared (core) and selected View Component Objects are also copied, or defining (920) a clone constructor/method of the Identity Component Class to provide that, when an object is cloned, only an Identity and selected View Component Objects are copied and a relationship is generated to reference a Shared Component Object(s).

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. An object-oriented database comprising:
at least two Complex Objects, each having at least one Component Object, wherein each of said Complex Objects shares at least one Component Object with another Complex Object.

2. A data structure comprising:
at least two Complex Objects, each having at least one Component Object, wherein each of said Complex Objects shares at least one Component Object with another Complex Object.

3. A server, comprising:
a memory having stored thereon executable instructions for generating at least two Complex Objects, each having at least one Component Object, wherein each of said Complex Objects shares at least one Component Object with another Complex Object, the memory also having an object-oriented database formed therein for storing object-oriented data; and
a processor, coupled to the memory, for utilizing the executable instructions to generate the Complex Objects.

4. The server of claim 3 wherein the executable instructions further include instructions for at least one of: managing or modifying the Complex Objects.

5. The server of claim 3 wherein an Identity Component Class defines the executable instructions for accessing properties of the Complex Objects.

6. The server of claim 5 wherein the executable instructions include instructions for overloading a construction method of the Identity Component Class to provide a View and Shared Component Object and to generate a relationship from an Identity Component Object to the View and Shared Component Object tat is generated when the Identity Component Object is generated.

7. The server of claim 5 wherein the executable instructions include instructions for overloading a destructor method of the Identity Component Class to provide for destroying View Component Objects and a Shared Component Object where said View/Shared Component Objects are unshared by another Complex Object.

8. The server of claim 5 wherein a copy constructor/method of the Identity Component Class is defined to provide that, when a Complex Object is copied, Shared and selected View Component Objects are also copied.

9. The server of claim 5 wherein a clone constructor/method of the Identity Component Class is defined to provide that, when a Complex Object is cloned, only an Identity and selected View Component Objects are copied and a relationship is generated to reference Shared Component Object(s).

10. A computer in a network, comprising:
a memory having:
an object-oriented database stored thereon comprising at least two Complex Objects, each having at least one Component Object, wherein each of said Complex Objects shares at least one Component Object with another Complex Object; and
software loaded thereon, wherein said software includes executable instructions for providing service to other computers in the network and executable instructions for generating Complex Objects; and
a processor, coupled to the memory, for implementing executable instructions for providing service to other computers in the network and for utilizing executable instructions to generate Complex Objects.

11. The computer of claim 10 wherein the executable instructions further include instructions for at least one of: managing or modifying the Complex Objects.

12. The computer of claim 10 wherein an Identity Component Class defines the executable instructions for accessing properties of the Complex Objects.

13. The computer of claim 12 wherein the executable instructions include instructions for overloading a construction method of the Identity Component Class to provide a View and Shared Component Object and to generate a relationship from an Identity Component Object to the View and Shared Component Object that is generated when the Identity Component Object is generated.

14. The computer of claim 12 wherein the executable instructions include instructions for overloading a destructor method of the Identity Component Class to provide for destroying View components and a Shared Component Object where said View/Shared Component Objects are unshared by another Object.

15. The computer of claim 12 wherein a copy constructor/method of the Identity Component Class is defined to provide that, when a Complex Object is copied, Shared and selected View Component Objects are also copied.

16. The computer of claim 12 wherein a clone constructor/method of the Identity Component Class is defined to provide that, when a Complex Object is cloned, only an Identity and selected View Component Objects are copied and a relationship is generated to reference Shared Component Object(s).

17. A computer in a network, comprising:
a memory having:
a first memory portion for storing data in a database; and
a second memory portion for storing executable instructions for generating at least two Complex Objects, each Complex Object having at least one Component Object and each Complex Object sharing at least one Component Object with another Complex Object; and
a processor, coupled to the memory, for utilizing the executable instructions to generate the Complex Objects.

18. The computer of claim 17 wherein the database is an object-oriented database for storing the at least two Complex Objects.

19. The computer of claim 17 wherein the executable instructions include instructions for providing service to other computers in the network.

20. The computer of claim 19 wherein the processor further implements the executable instructions for providing service to the other computers.

21. The computer of claim 17 wherein the executable instructions further include instructions for at least one of: managing or modifying Complex Objects.

22. The computer of claim 17 wherein an Identity Component Class defines the executable instructions for accessing properties of the Complex Objects.

23. The computer of claim 22 wherein the executable instructions include instructions for overloading a construction method of the Identity Component Class to provide a View and Shared Component Object and to generate a relationship from an Identity Component Object to the View and Shared Component Object that is generated when the Identity Component Object is generated.

24. The computer of claim 22 wherein the executable instructions include instructions for overloading a destructor method of the Identity Component Class to provide for destroying View Component Objects and a Shared Component Object where said View/Shared Component Objects are unshared by another Complex Object.

25. The computer of claim 22 wherein a copy constructor/method of the Identity Component Class is defined to provide that, when a Complex Object is copied, Shared and selected View Component Objects arc also copied.

26. The computer of claim 22 wherein a clone constructor/method of the Identity Component Class is defined to provide that, when a Complex Object is cloned, only an Identity and selected View Component Objects are copied and a relationship is generated to reference Shared Component Object(s).

27. A method for providing an object-oriented database with Complex Objects in a network, comprising the steps of:
  generating at least two Complex Objects, each having at least one Component Object, wherein each of said Complex Objects shares at least one Component Object with another Complex Object; and
  storing the Complex Objects in an object oriented database.

28. The method of claim 27 wherein the method further includes providing service to computers in the network.

29. The method of claim 27 wherein the method further includes at least one of: managing or modifying the Complex Objects.

30. The method of claim 27 wherein the method further includes a step of accessing properties of the Complex Objects defined by an Identity Component Class.

31. The method of claim 30 further including overloading a construction method of the Identity Component Class to provide a View and Shared Component Object and to generate a relationship from an Identity Component Object to the View and Shared Component Object that is generated when the Identity Component Object is generated.

32. The method of claim 30 further including overloading a destructor method of the Identity Component Class to provide for destroying View Component Objects and a Shared Component Object where said View/Shared Component Objects are unshared by another Complex Object.

33. The method of claim 30 further including defining a copy constructor/method of the Identity Component Class to provide that, when a Complex Object is copied, Shared and selected View Component Objects are also copied.

34. The method of claim 30 further including defining a clone constructor/method of the Identity Component Class to provide that, when a Complex Object is cloned, only an Identity and selected View Component Objects are copied and a relationship is generated to reference Shared Component Object(s).

35. A tailored server for reducing overhead of dynamically linking attribute values across objects and minimizing memory requirements for storing cloned objects, the tailored server comprising:
  an object oriented database configured to utilize a processor to hide individual component classes of complex objects.

36. A system for reducing overhead of dynamically linking attribute values across objects and minimizing memory requirements for storing cloned objects, the system comprising:
  a modified tailored server, coupled to a client computer, for utilizing class methods and an object oriented database to hide individual component classes of complex objects.

37. A system for reducing overhead of dynamically linking attribute values across objects and minimizing memory requirements for storing cloned objects, the system comprising:
  a front-end server, coupled to an object oriented database and to a client computer, and configured to operate to hide individual component classes of complex objects.

38. A system for reducing overhead of dynamically linking attribute values across objects and minimizing memory requirements for storing cloned objects, the system comprising:
  a client computer coupled to a server and including an object oriented database with object methods configured to utilize a processor to hide individual component classes of complex objects.

39. A method for managing a Complex Object having a plurality of Component Object Classes, the method comprising the steps of:
  partitioning the plurality of Component Object Classes;
  establishing relationships between the partitioned Component Object Classes; and
  hiding the partitioned Component Object Classes behind a set of methods such the partitioned Component Object Classes appear as a single Component Object Class.

* * * * *